(12) United States Patent
Goldhamer

(10) Patent No.: US 9,055,446 B2
(45) Date of Patent: Jun. 9, 2015

(54) METHOD FOR MANAGING HETEROGENEOUS BASE STATIONS IN A WIRELESS NETWORK

(75) Inventor: Mariana Goldhamer, Ramat Gan (IL)

(73) Assignee: ALVARION LTD. (IL)

( * ) Notice: Subject to any disclaimer, the term of this patent is extended or adjusted under 35 U.S.C. 154(b) by 359 days.

(21) Appl. No.: 13/125,970

(22) PCT Filed: Oct. 29, 2009

(86) PCT No.: PCT/IL2009/001006
§ 371 (c)(1),
(2), (4) Date: Apr. 25, 2011

(87) PCT Pub. No.: WO2010/049930
PCT Pub. Date: May 6, 2010

(65) Prior Publication Data
US 2011/0211486 A1 Sep. 1, 2011

(30) Foreign Application Priority Data

Oct. 30, 2008 (IL) .......................................... 194996

(51) Int. Cl.
*H04L 5/00* (2006.01)
*H04W 16/16* (2009.01)
*H04W 72/08* (2009.01)

(52) U.S. Cl.
CPC ............. *H04W 16/16* (2013.01); *H04L 5/0007* (2013.01); *H04L 5/003* (2013.01); *H04W 72/082* (2013.01)

(58) Field of Classification Search
CPC ..... H04L 5/0007; H04L 5/003; H04W 16/16; H04W 72/082
USPC ............... 370/310.2, 321, 324, 328, 329, 350
See application file for complete search history.

(56) References Cited

U.S. PATENT DOCUMENTS

| 2008/0090575 | A1 | 4/2008 | Barak et al. | |
| 2009/0129332 | A1* | 5/2009 | Dayal et al. | 370/330 |
| 2009/0280819 | A1* | 11/2009 | Brisebois et al. | 455/446 |
| 2010/0027431 | A1* | 2/2010 | Morrison et al. | 370/252 |

FOREIGN PATENT DOCUMENTS

| GB | 2357399 A | 6/2001 |
| WO | WO 2005/062798 A3 | 7/2005 |
| WO | WO 2008/007375 A3 | 1/2008 |

OTHER PUBLICATIONS

International Search Report for PCT/IL2009/001006 mailed Dec. 2, 2010.
Kim et al.: "Interference Mitigation using FFR and Multi-Cell MIMO in Downlink", IEEE c802.16m-08/783r1, pp. 1-6.

(Continued)

*Primary Examiner* — Khaled Kassim
(74) *Attorney, Agent, or Firm* — Hershkovitz & Associates, PLLC; Abe Hershkovitz

(57) ABSTRACT

A method and devices are provided to enable operation while experiencing reduced interference of at least two base stations in a wireless network wherein at least one of base stations is deployed in a femto deployment configuration and at least one of the others is deployed in a different deployment category. The method comprises preventing the usage of at least one radio resource selected from among sub-carriers comprised within a radio channel and/or time-domain resource, from one of the at least two base stations.

1 Claim, 2 Drawing Sheets

(56) References Cited

OTHER PUBLICATIONS

Mariana Goldhamer: "Control channel allocation for femto-cells", IEEE c802.16m-08/1350r1, Oct. 31, 2008, pp. 1-8.

Mariana Goldhamer: "Operational rules for self-organized radio deployment", IEEE c802.16m-08/1352, Oct. 31, 2008, pp. 1-5.
Samsung: "Flexible Fractional Frequency Reuse Approach" http://www.3gpporg/ftp/tsg_ran/WG1_RL1/TSGR1_43/Docs/, XP002387571, Nov. 11, 2005, pp. 1, 2, 6 and 7.

* cited by examiner

METHOD FOR MANAGING HETEROGENEOUS BASE STATIONS IN A WIRELESS NETWORK

FIELD OF THE INVENTION

The present invention relates generally to wireless communications, and in particular, to allocation and selection of resources in order to reduce interferences in communications exchanged within a wireless network.

BACKGROUND OF THE INVENTION

In order for wireless networks operators to solve one of their biggest problems—how to achieve higher signal strength where one needs or wants it most, they have started to deploy their own or rely on end users to buy personal devices that act similarly to the Wi-Fi routers, in order to provide nearby cellular bandwidth in hard-to-reach places like offices and homes.

Therefore, the newest type of cell sites, named femtocells (a femtocell—originally known as an Access Point Base Station—is a small cellular base station, typically designed for use in a home or small business) are setting out to solve carriers' often-expensive problem of providing complete coverage. Mobile terminals such as mobile phones usually work well in metropolitan areas, but when traveling a few miles off these areas e.g. into the countryside, the signal strength drops rapidly. Also, most frustrating to many people is that the signal strength at their homes or inside offices is often unusable.

Thus, according to the femto solution the end-users may buy small femto devices that are personal cellular sites. The femto device has an antenna to boost the available signal as well as an Internet connection. The device uses the end user Internet connection to connect to the service provider's network and to route the user's phone calls. Normally, femtocells operate within the operator's licensed spectrum.

Typically, the cells of the wireless network may be divided into the following three categories:

First category—Protected cells, for example macro-cells that may extend for example for about 1.5 km from the base station in sub-urban deployment at frequencies being around 2.5 GHz;

Second category—Regular cells, for example micro-cells that may extend for example for about 300 m from the base station in urban deployments or relay cells; and Third category—Cells such as femtocells, which include a base station and subscriber terminal(s) that might create meaningful interference to MSs of the other cells. The typical operation range of a femtocell is 30 m.

As will be appreciated by those skilled in the art, scenarios that entail an overlapping deployment while using the same or adjacent frequency channels between two (or more) cells of these categories, are generally possible. However, with the exception of femtocells, which may not belong to the mobile operator, the BS-MS interference can simply be resolved by applying a hand-over process following which the MS will be serviced by the BS that is responsible for the creation of interference thereto. In the case of femtocells, the hand-over is limited to such situations where the user's access is allowed by the target cell. A femto Base Station, which is typically owned by a private home user, may provide service only to the mobile terminals belonging to that user.

The problem yet to be solved is the reduction in interference due to overlapping that may exist between a femtocell and any of the other cells. The most problematic interference problem would be noticeable when a MS belonging to a macro-cell operates at the proximity of a femto-BS.

SUMMARY OF THE INVENTION

It is therefore an object of the present invention to provide a method and apparatus to enable operation of base stations of different categories within overlapping geographical areas.

It is still another object of the present invention to provide a method and apparatus to reduce interferences to subscriber terminals operating in cells of a wireless network, which are created due to communication traffic being exchanged in their vicinity between a femto-BS and the respective subscriber terminals associated therewith.

It is another object of the present invention to provide a method and means for providing protection to the traffic associated with certain cells operating at a femto-BS vicinity, that might suffer, for example, from interference caused by a femto-BS (Base Station) communicating with an MS (mobile or fix subscriber).

It is yet another object of the present invention to provide a method and means for a self deployment of a new base station in the vicinity at which other base stations have already been deployed, such that no frequency planning is required.

Other objects of the invention will become apparent as the description of the invention proceeds.

According to a first embodiment of the present invention there is provided a method to enable interference mitigation between at least two base stations in a wireless network wherein each of the at least two base stations is of a different deployment category than the other, wherein a deployment category is a member selected from among the group consisting of protected cells, regular cells and femtocells, as defined hereinabove. The method comprises allocating at least one radio resource selected from among sub-carriers comprised within a radio channel and/or a time-domain resource thereof only to one of the at least two base stations for carrying out transmission and/or reception activities.

According to another preferred embodiment of the method provided, a first base station of the at least two base stations is deployed in a femtocell deployment category and a second base station of said at least two base stations is deployed in other than a femtocell deployment category, and wherein there is at least one radio resource used by the second base station for transmitting communications towards its respective one or more subscriber terminals, while the first one base station is prevented from using that at least one radio resource.

By another preferred embodiment, the method provided, further comprising a step of allocating radio resources for control channels carrying control information. This step comprising:

for at least one of the base stations, transmitting control information at pre-defined intervals in at least one of the downlink radio frames, wherein the at least one downlink radio frame comprises:

in a single frequency channel and/or one or more adjacent frequency channels thereof, downlink control information which is transmitted while using at least one radio resource allocated for at least one control channel, for use only by the at least one base station that is not deployed in a femtocell deployment category; and wherein the downlink control information is conveyed in at least one sub-carrier partition within the corresponding single frequency channel and/or adjacent frequency channel thereof, and/or by being associated with one or more time intervals.

Preferably, a different deployment category is a member selected from among a group consisting of a protected cell (first category) such as a macro-cell for example, a regular cell (second category) such as a micro-cell for example and a femtocell (third category). More preferably, at least one of the different deployment categories is a femtocell.

The term "control information" as used herein and throughout the specification and claims is used preferably to encompass also information that relates to the preambles and/or sounding of sub-carriers to be used.

The term "subscriber terminal" as used herein and throughout the specification and claims encompasses both mobile terminals and fixed terminals, although it is typically referred to in the specification for the simplicity of the description as a mobile (MS) terminal, however, the present invention should be understood to encompass both fixed and mobile subscriber terminals.

According to another preferred embodiment of the invention, the method provided, further comprising a step of receiving in at least one of the two base stations, at least one uplink radio frame transmitted by an associated subscriber terminal, wherein in a single frequency channel and/or an adjacent frequency channel thereof, comprising at least one radio resource allocation for transmitting at least one control and/or at least one data channel and wherein the at least one radio resource allocation is used only by the at least one base station that is of a different deployment category than the other base station, and wherein the radio resource allocation for uplink transmissions is characterized by being associated with at least one pre-defined sub-carrier partition within the corresponding single frequency channel and/or adjacent frequency channel thereof, and/or by being associated each with one or more pre-defined time intervals.

By still another preferred embodiment of the present invention, in a wireless network comprising at least one base station and at least one subscriber device operative to communicate therewith, and at least one other base station and at least one subscriber device operative to communicate therewith, a method is provided for allocating radio resources for control channels to enable reducing interference to communications transmitted from each of the base stations and received by its respective at least one subscriber terminal. The method comprises, for at least one of the base stations, transmitting control information at pre-defined intervals in at least one of the downlink radio frames, wherein the control information transmitted by each of the at least two base stations is associated with communications transmitted from the base station and received by its respective at least one subscriber terminal, and wherein at least one downlink radio frame transmitted by at least one of the at least two base stations comprises:

in a single frequency channel and/or one or more adjacent frequency channels thereof, at least one radio resource allocation for control channels, carrying control information, is provided for transmitting downlink control information associated with the respective one of the at least two base stations, and wherein the at least one radio resource allocation is used only by at least one base station that is of a different deployment category than the other base station;

and wherein the at least one radio resource allocation for the at least one control channel is selected for one of the at least two base stations within the at least one downlink radio frame, based upon at least one of the following:

(i) the deployment category associated with the one base station if two different deployment categories are defined for the at least two base stations; and (ii) minimum interference assessment by that one base stations.

By yet another preferred embodiment of the invention, the minimum interference assessment is carried out by each base station by measuring interference experienced in a receive state within the at least one radio resource allocation for control channels, at pre-defined time intervals.

The interference measurements may be carried out either on the downlink transmission, the uplink transmissions or both.

By yet another embodiment the minimum interference assessment is carried out by measuring power levels of communications generated by the at least one other base station and/or at least one other subscriber terminal, while operating in a transmit state within the at least one radio resource allocation for the at least one control channel, at pre-defined time intervals.

According to still another embodiment, the minimum interference assessment is used as one of the criteria for selecting the at least one radio resource allocation for the at least one transmit and/or receive control channel.

In accordance with another aspect of the present invention there is provided a wireless femto base station (i.e. a base station deployed in a femto deployment) comprising a processor configured to prevent transmission during some (e.g. at least one) downlink time intervals and/or sub-carriers, to reduce interference to communications exchanged between at least one other base station of a different deployment category and its respective one or more subscriber terminals.

According to another preferred embodiment of the invention, there is provided a wireless base station comprising:

at least one transceiver operative to transmit control information within at least one pre-defined radio resource in at least one downlink radio frame, wherein the control information is associated with communications transmitted from that base station; and a processor configured to provide at least one downlink radio frame for transmission by the transceiver, wherein the downlink radio frame comprising:

in a single frequency channel and/or one or more adjacent frequency channels thereof, at least one radio resource for transmitting at least one control channel comprising downlink control information associated with that base station;

wherein said radio resource allocation for the at least one control channel for downlink transmission is characterized by being associated each with at least one pre-defined sub-carrier partition within the corresponding single frequency channel and/or adjacent frequency channel thereof, and/or by being associated with one or more pre-defined time intervals;

and wherein at least one of the radio resource allocation for at least one control channel is prevented from being used by at least one another base station either in any of the sub-carrier domain and/or in the time domain.

In accordance with another aspect of the invention there is provided a wireless subscriber terminal that comprises:

at least one transceiver operative to receive from an associated base station, control information at pre-defined intervals in at least one downlink radio frame, wherein the control information is associated with communications transmitted from that base station; and a processor configured to provide at least one uplink radio frame for transmission by the transceiver wherein in a single frequency channel and/or an adjacent frequency channel thereof, at least one radio resource allocation is prevented from being used for radio transmissions to a base station deployed in a deployment category other than that base station.

DETAILED DESCRIPTION OF THE INVENTION

A better understanding of the present invention may be obtained when the following non-limiting detailed description is considered in conjunction with the accompanying drawings.

Let us first assume that the service provider operates by providing each possible operating radio channel in accordance with a basic sharing scenario, while indicating which of the cells categories may share the radio channel, so that a protected cell or a regular cell may share the channel with a femtocell, etc.

As the present invention allows a self-organization at the radio level, the operator (whether on a proprietary basis or as a rule established in a future Recommendation) will determine the minimal OFDMA sub-carrier partitions and/or number of multi-carriers within a frequency channel, and time resources, to be reserved for the control information channels and for data conveying channels for the different cell categories discussed above. In each system the operational frequency-time resources are chosen based upon the above provisioning concept and a set of interference assessment and avoidance rules that will be further discussed. It should be noted that the solution proposed by the present invention eliminates the need for frequency planning or inter-cell communication for the basic operation.

Allocation of Resources within a Superframe

The resource allocation takes into account the BS-SS or SS-SS interference (some cases may appear in a relay operation). In general the allocation of dedicated resources for the control and data channels in OFDMA (frequency) domain would be sufficient to resolve the interference, but there are cases in which due to the short distance between a femto-BS and a MS belonging to a macro-cell (and associated with its respective BS), the interference can be separated only in the time domain.

Allocation of Resources in OFDMA (Frequency) Domain
Fractional Frequency Reuse

Figure 1:
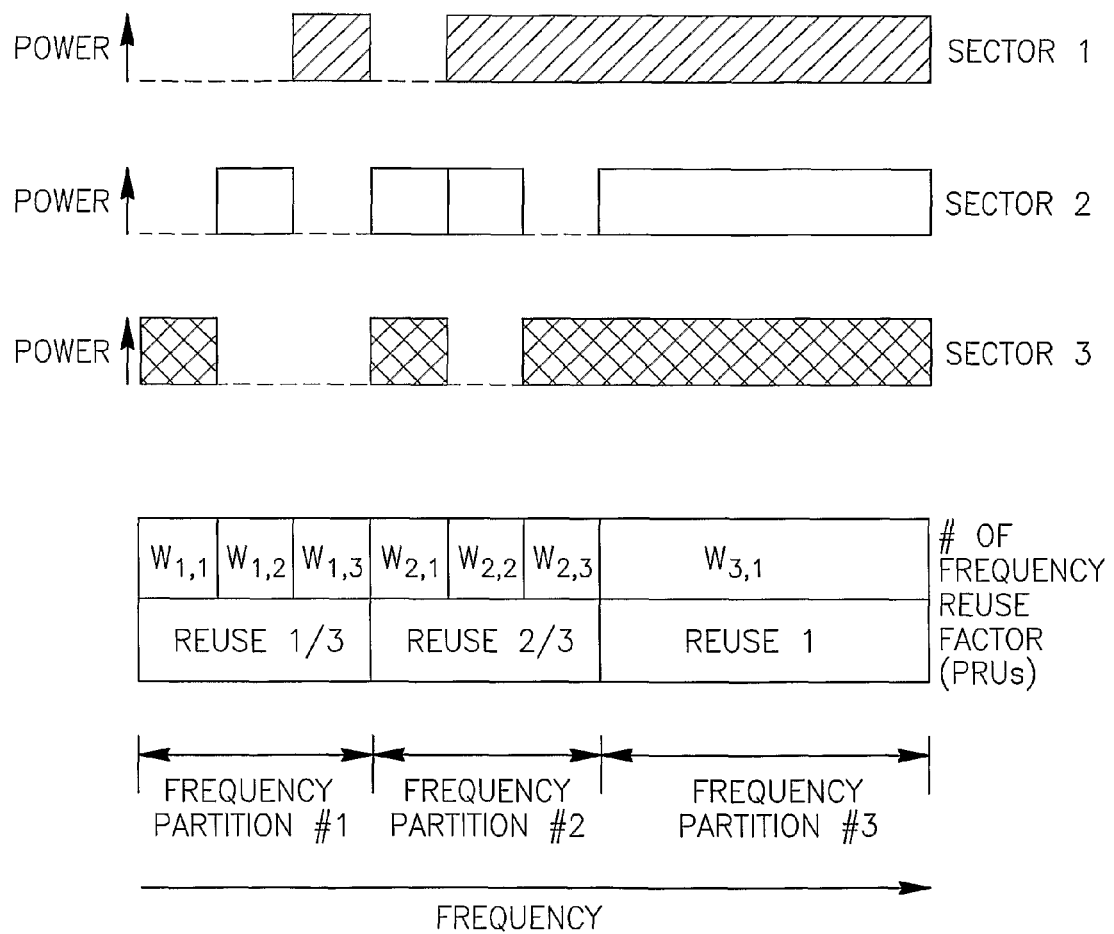
FIG. 1 illustrates a prior art scheme as implemented by the FFR concept of the IEEE Recommendation 802.16m.

The FFR (Fractional Frequency Reuse) concept as adopted by the IEEE Recommendation 802.16m is illustrated in FIG. 1. In this Figure, a given BS sector may use an OFDMA (frequency) resource, while enjoying relatively high power allowance and be subjected to low interference. This can be achieved in three modes:

Alone (Reuse 1/3)—in the case of Reuse 1/3, a given frequency (OFDMA) resource is allocated at any given moment for high transmission power allowance only to one sector in a Base Station using 3 sectors. Such functionality is also referred to in the art as "Reuse 3".

Simultaneously with another sector (Reuse 2/3). Operating under reuse 2/3 scheme is preferably suitable for those cases in which two sectors belonging to two different Base Stations do not interfere with each other, for example due to geographical separation, or due to the interference nulling capability of the receivers.

In parallel with all the other sectors (Reuse 1). It should be noted that also single sector Base Stations can separate their interference by using one of the resources allocated to a sector. The principles for the FFR adapted to Reuse 1/3 or 2/3 may easily be extended to Reuse 1/4 or 2/4, by allocating 4 different partitions instead of 3 different partitions.

The above solution is not suitable for a deployment using different cell categories which may overlap.

Resources for Control Channels

The control channels include transmission of information related to synchronization, frame control header ("FCH"), sounding, resource allocation, and the like. FCH is an important control element, because it allows to an MS to find where the sector operational resources are located in the time/frequency domain. The control channel is an important system resource and therefore should be designed for good spectral efficiency and reliability in operation.

The downlink (DL) and up-link (UL) resource allocation for the control channels of protected cells is reserved within the frequency channel, in those OFDMA partitions that enjoy controlled (low) interference from adjacent cells. The size of these partitions may be different in different frames or even in sub-frames belonging to a superframe, due to the different amount of information that is transmitted in the first IEEE 802.16m superframe (which includes information relating to the superframe operation) as opposed to the regular frames. A partition may comprise adjacent sub-carriers (localized) or non-adjacent sub-carriers (distributed). A sub-carrier may have variable width in the frequency domain, to comply with the FFT size or the assignment done for each sub-carrier. The description provided hereinafter refers to the sub-carriers in the OFDMA context, but it should be understood that the present invention is not limited thereto.

The resource allocation for the control channels of the regular cells is dependent on the mode in which the frequency channel is used, for example:

If the frequency channel is used only for regular cells, the regular cells may use all the available control channels;

If the frequency channel is used by both protected and regular cells, the regular cells will use the control channel allocations which have not been exclusively assigned to the protected cells.

If the frequency channel is used only by category 1 type of systems, such systems may use the OFDMA resources reserved for regular cells in the reuse 2/3 mode.

Femtocells may be treated as regular cells as long as no MS belonging to a category 1 cell or a category 2 cell has been identified by the BS and/or the SS of that femtocell.

The OFDMA resources using reuse 1/3 mode enjoy high link budget and minimum interference from the adjacent cells, because each sector can have its own dedicated OFDMA partition. Due to these properties the OFDMA resources allocated while using Reuse 1/3, are most suitable for the operation of the control channels for the protected and regular cells.

Reuse 1 operation is suitable for those cells or part of cells which do not interfere with each other or do not have stringent cell size requirements. The allocation within the control channels of the category 2 or category 3 cells may fall into this type of reuse.

There are cases in which a base station is not linked to an active MS. The control channels are used to advertise the presence of the BS and should be active at established and synchronized time intervals, relative to the superframe timing. There are also situations when, due to the dense deployment and line-of-sight operation of the cells, more than 3 different control channels will be needed for the category 2 and category 3 type of cells.

However, this will create a need for a sufficiently high number of control channels for category 2 and category 3 cells.

Resources for Data Channels

The resource allocation for the data channel includes minimum operational resources enjoying low interference and extended operational resources. The extended operational resources are shared between base stations.

The data channels may utilize the resources of their cell category and the FFR split of the frequency channel. The frames being used should preferably correspond to the frames in which the control channels are active, but also other possibilities may be valid.

The resources in the reuse 1/3 area should preferably be exclusively allocated to category 1 systems, if they use the channel. The reuse 1 area should be the main operational area for category 3 systems, if category 1 systems utilize that channel.

Category 2 systems should have the capability to use either the isolation offered by deployment according to reuse 1/3, or the isolation offered by street deployment. Their data channels may be placed in a reuse 2/3 area or in a reuse 1 area. The actual reuse factor for the category 2 cells will be determined in accordance with the real requirements.

Resource Allocation in the Superframe (Time) Domain

There are cases where the BS-MS interference is very strong, as the case of a MS belonging to a macro cell operating in the vicinity of a femto-BS. In a similar mode, the femto-BS is interfered by a mobile SS belonging to another cell which is operative in its vicinity. Significant interference can appear also in the case of dense micro-cell deployment.

The strong interference created by femtocells affects the MS receiver SINR (Signal to Interference and Noise Ratio) due to the limited adjacent channel rejection or even due to interference between different sub-carriers, while the MS transmissions will create interference to the femto-BS reception activity.

The time separation as suggested by the present invention, resolves this kind of interference, but it requires reserving different time resources for the control and data channels transmitted by the femto-BS creating the interference.

There are a number of possibilities for the allocation of these resources. The IEEE 802.16m superframe consists of 4 frames, where each frame may have a number of down-link sub-frames. The IEEE 802.16m control information is transmitted at the start of every frame, while the legacy systems may also use part of the sub-frames.

Allocation of Resources in Both OFDMA (Frequency) and Time Domain

The following rules address the usage of the frequency-time resources by networks belonging to different categories.

Category 1 systems are the only ones entitled to use:
Dedicated frequency (e.g. OFDMA) partitions allocated for reuse 1/3, for both control and data Channels;
Dedicated time (sub-frames) partitions allocated within a superframe. In case of a superframe composed of four frames, such allocations can include for example the first and 3rd frame, for both down-link and up-link, in both FDD and TDD type of operation;
all the available OFDMA/time partitions, however in such cases the interference is minimized only in the protected frequency and time intervals.

Category 3 systems when sharing a channel with a category 1 or category 2 systems are assigned dedicated OFDMA/time partitions which do not overlap with the dedicated partitions for the category 1 systems. Only the dedicated time partitions will enjoy reduced interference. For example, category 3 systems can use:
Dedicated time partitions: second frame within the superframe;
Dedicated frequency partitions: the entire frequency channel, excluding those frequency partitions allocated to the category 1 systems.

Category 2 systems, which do not create harmful interference to category 1 systems operating within the same frequency channel, are assigned:
Different frequency partitions from those used by the category 1 systems operating at the same frequency channel. However, some of the frequency partitions can be used by either category 1 or category 2 systems;
Same time partitions as those used by the category 1 systems operating at the same frequency channel.

Control Channel

Figure 2:
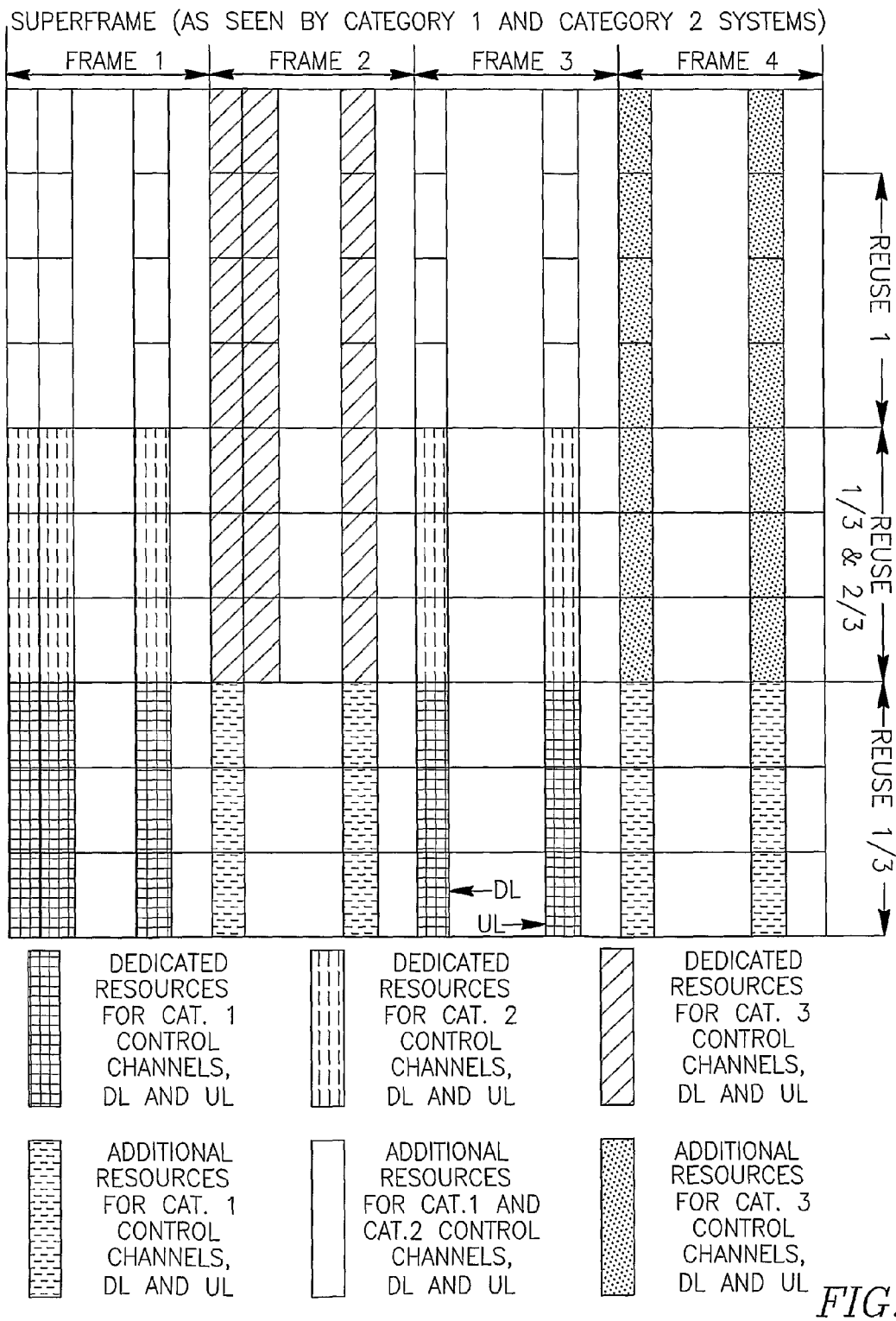
FIG. 2 illustrates an example of an embodiment according to the present invention for resource allocation for control channels in different re-use schemes for different deployment categories.

Based on the above description, the OFDMA and time domains may be split in a number of partitions. An example illustrating this feature is shown in FIG. 2 and explained hereinbelow.

In this Figure there are three different partitions for different reuse factors. The zone marked with "reuse 1/3 AND 2/3" may be used by:
Category 1 systems in a reuse of 2/3 mode
Category 2 systems in a reuse of 1/3 mode.

In order to allow easier differentiation between the three zones, this AND zone will be referred to hereinafter as a reuse 2/3 zone.

The control channel for category 1 (protected) cells should preferably be placed within each frame, with the following restrictions, although some scheduling constraints may result from the experienced interference Superframe domain (time):
First frame of the super-frame, best interference experience; allocation suitable for the superframe control channel.
Second frame of the superframe, but the reception of the downlink traffic cannot be guaranteed for the MSs affected by femto-BS interference;
Third frame of the superframe, good interference experience;
Fourth frame of the superframe, but the reception of the downlink traffic cannot be guaranteed for the MSs affected by Femto-BS interference.

OFDMA domain
Dedicated OFDMA partition (reuse 1/3 as illustrated in FIG. 1);
Additional possible partitions in reuse 2/3 zones (if category 2 cells are not deployed within the channel).

The control channels for category 2 (regular) cells may be placed as follows:

Superframe domain
Same as category 1 systems, but exceptions can be made to offer more resources to femtocell control channels. This is demonstrated in Frames 2 and 4 of FIG. 2, where the Reuse 2/3 partition is used for the benefit of category 3 cells.

OFDMA domain
Dedicated OFDMA partitions (within reuse 2/3 as illustrated in FIG. 1).
Additional possible partitions in reuse 1 area.

The control channel for category 3 cells may be placed as follows:
- 2nd frame of the super-frame or a well-known sub-frame inside the superframe, which is different from the resources allocated to category 1 and category 2 cells; this partition is suitable for the superframe control channels of category 3 cells.
- Shared OFDMA partitions (reuse 1 and/or reuse 2/3 as illustrated in FIG. 1).

In a particular case, category 2 cells could use the partitions allocated for category 1 cells if there are no category 1 cells on the channel and vice versa.

It should be noted that due to the potential of creating interference over different sub-carriers in the channel or in the adjacent and alternate channels, the control channels of the category 3 cells have always to operate in a different time partition. Special preambles or control elements are useful for identifying the BS of such cells. These cells are preferably forbidden from using the time resources allocated to the protected cells in the frame structure.

Let us now consider FIG. 2 which illustrates an example indicating the resources to be used for the control channels, in a case where all cell categories are used in a single frequency channel.

In the example demonstrated in FIG. 2 the distribution of the control channels was selected so as to avoid too long delays. Priority was given to category 1 systems. A relatively high number of control channels were allocated for category 2 and category 3 systems, having a more dense deployment and also a higher probability that the data channels will not be fully used.

Data Channels

Data should be scheduled according to the rules of reuse 1/3, 2/3 and 1. More flexibility related to the data traffic and resource allocations can be achieved upon implementing inter-cell coordination procedures.

Allocation of Resource for Relays

The frequency/time resources for the relay backhauling will typically be provided by the operator. The relay frame structure should define within the time intervals in which the relay access link is operational similar frame structure as used in the general case. The relays can be assimilated with any of the above categories, according to the deployment scenario.

Any case of harmful transmit-receive interference which may appear between specific radio devices, may be resolved by time separation.

Operational Rules for the Self-Organizing Networks

Rules for the Installation Phase of BS

At the installation phase, a BS shall determine the most suitable frequency-time resources for the operation of its control and data channels, according to its own category of operation.

In order to carry out such determination, the base station should be aware of the following:
- Possible operating resources as established by the operator (or as dictated by the IEEE Recommendation) within the frame structure;
- Category of operation of that base station, as established by manufacturer or by operator;
- Interference potential, based on measurements.

The operating resources are can be any one or more of the following:
- Available frequency channels; Time-frequency resources for the control channel. These resources may be used by BSs actively communicating with the associated MSs or by BSs which signal their presence to MSs which look for association or for hand-over. It is possible to further separate the resources for regular operation from resources used only for signaling the BS presence thereby allowing quick association of the MS. In case that the resources are separated, during the installation phase the BS will use only the dedicated control channel resources used for installation;
- Minimum resources for data channels, if allocated; and
- Extended operational resources for the control and data channels.

Assessment of Interference

New base stations will preferably assess the interference, based on one or more of the following procedures:

Measuring the interference caused by other base stations during their transmissions while using the resources assigned to control channels:
- downlink (DL) sub-frames for TDD operation;
- in transmit frequency channels for FDD operation.

These measurements can be done by a MS installed in the immediate proximity of the BS, MS which will carry out the measurements during the downlink sub-frames (TDD systems) or on the downlink frequency (FDD systems).

Measuring the interference caused by the MSs associated with other base stations during the MS transmission intervals (TDD) or frequencies (FDD). If up-link reference carriers or control channels are assigned and have sufficient short repetition intervals, these reference carriers or control channels may give the best indication. If the above conditions are not fulfilled, it is possible to define time intervals within which all MSs will transmit.

High interference levels during downlink activity indicate the presence of another BS (or a BS sector) operating in the vicinity of the new BS. The new BS would therefore create interference to the MSs associated with that other BS. The new BS should in this case avoid using the same resources.

High interference levels during the up-link activity indicate high levels of MS interference. The new BS should avoid using those resources for its up-link operation.

Preferably, pairs of DL and UL resources are generated, so that a new BS would avoid using resources which are interfered either in the UL direction or the DL direction.

It should be noted that BS can also sense interference caused by the MS operation in the adjacent OFDMA sub-channels or adjacent frequency channels. For example, category 3 systems can generate such accumulated interference cases. In these cases, the category 3 operation should be restricted in the time domain.

Choosing the Suitable Resource for Operation

A new base station should preferably choose the least interfered resource as allocation for its control channels and the least interfered and occupied resource for the operation of its data channels.

Additional Rules

The following rules extend the operational time-frequency resource for cases when the presence of other systems has not been detected.

If a category X system does not detect interference above a pre-defined power threshold, say $P_{xy}$, within the resources allocated for category Y systems, then the category X system may temporarily use the specific frequency and/or time resources allocated for the category Y system, with the exception that minimum resources should be allocated for the control channels of category Y systems.

Following the above procedure will ensure that a category Y system is always allowed to start its operation and find a resource for its Control Channels.

Rules for the Operation Phase of the BS
Maximum Power

A category 3 BS should have a lower maximum power level than that of a category 2 BS, whereas a category 2 BS should have a lower maximum power level than that of a category 1 BS.

Traffic Scheduling

BS transmissions and receptions should preferably be scheduled in accordance with the following rules:
  The BS should schedule the downlink transmissions to the interfered MSs within the dedicated allocations; and
  The BS should schedule the up-link transmissions which experience interference within the dedicated allocations.

Change of Operational Resources for Control Channels

If the BS cell (the BS or its associated MSs) is interfered during the operational phase, it will be allowed to re-assess the interference in the same way as the newly installed BSs, consequently some of the transmissions of its control channels will be skipped for the benefit of listening to the medium. Another possibility is the installation of an MS in the immediate proximity of the BS, an MS which will carry out the measurements at the same mode as described before in relation to the description of the installation phase. It is recommended that such intervals will be announced to the associated MSs.

The changes of the operational channels are allowed only at relatively random, long time intervals, in order to avoid network instabilities.

Identification of Category 2 Cells Creating Harmful Interference

A category 2 base station may start operating according to category 2 rules as long as it does not cause harmful interference to category 1 cells.

The interference to a category 1 cell can be caused by accumulated transmissions of other systems operating as category 2 or while an MS that communicates with a category 1 BS approaches a category 2 base station. Such interference cases can be assessed by a category 2 cell (BS and MSs) by listening to the media. If the interference levels sensed from time to time are higher than a level either pre-defined by the IEEE Standard or by the operator, such a BS will have to change its operating mode, and to operate according to the category 3 rules. It should be noted that such a level will be established as a function of the transmitted powers of the category 1 and category 2 base stations. For the sake of simplicity one may assume that the MS transmission powers are similar.

Relay Operation

The relays access cell can be assimilated with any of the above cell categories. The relay acts as a BS for its access cell.

It is to be understood that the above description only includes some embodiments of the invention and serves for its illustration. Numerous other ways of carrying out installation and/or operation of base station at the vicinity of differently deployed base stations may be devised by a person skilled in the art without departing from the scope of the invention, and are thus encompassed by the present invention. Also, as will be appreciated by those skilled in the art, every such exemplified embodiment has different advantages and also may apply to different implementation approaches for example while implementing various communication protocols such as GSM, LTE, UMTS and the like.

The invention claimed is:

1. A method for distributing resources among categories of cell types, the method comprising:
  dividing a superframe domain into at least a first frame, a second frame, a third frame, and a fourth frame; dividing the first frame into first set of subframes;
  dividing the second frame into second set of subframes;
  dividing the third frame into third set of subframes;
  dividing the fourth frame into fourth set of subframes; and
  partitioning a frequency domain into a reuse 1 zone, a reuse 2/3 zone, and a reuse 1/3 zone;
  allocating resources in the reuse 1 zone as follows:
  allocating a first subframe in the first set of subframes to additional resources for category 1 and category 2 control channels;
  allocating a first subframe in the second set of subframes to dedicated resources for category 3 control channels;
  allocating a first subframe in the third set of subframes to the additional resources for the category 1 and the category 2 control channels; and
  allocating a first subframe in the fourth set of subframes to additional resources for the category 3 control channels;
  allocating resources in the reuse 2/3 zone as follows:
  allocating the first subframe in the first set of subframes to additional resources for dedicated resources for category 2 control channels;
  allocating the first subframe in the second set of subframes to the dedicated resources for category 3 control channels;
  allocating the first subframe in the third set of subframes to the dedicated resources for the category 2 control channels; and
  allocating the first subframe in the fourth set of subframes to the additional resources for the category 3 control channels; and
  allocating resources in the reuse 1/3 zone as follows:
  allocating the first subframe in the first set of subframes to dedicated resources for the category 1 control channels;
  allocating the first subframe in the second set of subframes to additional resources for the category 1 control channels;
  allocating the first subframe in the third set of subframes to the dedicated resources for the category 1 control channels; and
  allocating the first subframe in the fourth set of subframes to the additional resources for the category 1 control channels.

* * * * *